United States Patent [19]

Gerosa et al.

[11] Patent Number: 4,987,404
[45] Date of Patent: Jan. 22, 1991

[54] CONTROL UNIT FOR THE PILOT LAMPS OF THE INSTRUMENT BOARD OF AN AUTOMOTIVE VEHICLE

[75] Inventors: Alessandro Gerosa; Edoardo Rogora, both of Milan; Ezio Villa, Arese; Andrea Susa, Vanzago, all of Italy

[73] Assignee: Alfa Lancia S.p.A., Arese, Italy

[21] Appl. No.: 192,694

[22] Filed: May 10, 1988

[30] Foreign Application Priority Data

May 13, 1987 [IT] Italy ............................. 20506 A/87

[51] Int. Cl.⁵ .......................................... B60Q 1/00
[52] U.S. Cl. ................................... 340/461; 340/642
[58] Field of Search ............. 340/458, 461, 521, 641, 340/642; 307/10.8

[56] References Cited

U.S. PATENT DOCUMENTS 3,569,933  3/1969  Longenecker et al. ............. 340/458
4,234,866  11/1980  Kuroda et al. ................. 340/458 X
4,555,694  11/1985  Yanagishima et al. ............. 340/524

Primary Examiner—Joseph A. Orsino
Assistant Examiner—Jeffery A. Hofsass
Attorney, Agent, or Firm—Charles E. Brown; Charles A. Brown

[57] ABSTRACT

A control unit for verifying the functionality of the pilot lamps installed on the instrument board of an automotive vehicle is proposed, wherein a central control unit continuously monitors the functional condition of the devices monitored by the pilot lamps and wherein by means of hand-operated actuation device, the functionality of the pilot lamps can be verified also while the car is running.

4 Claims, 2 Drawing Sheets

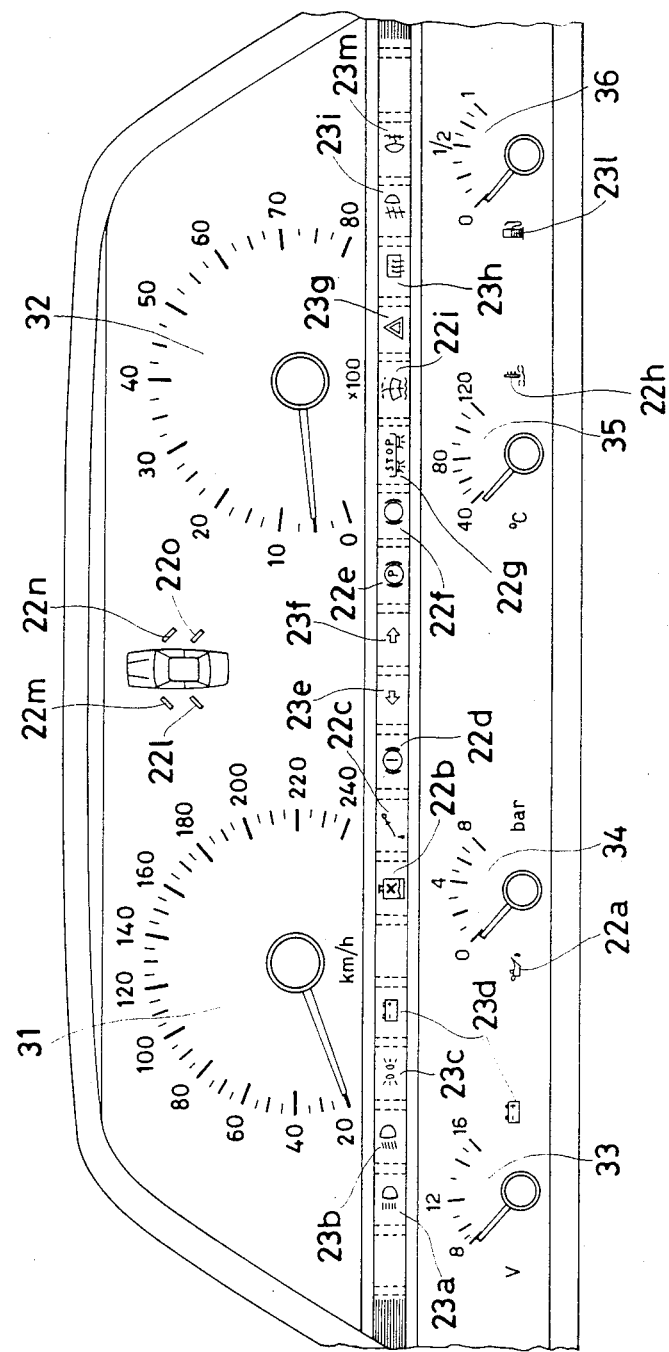

CONTROL UNIT FOR THE PILOT LAMPS OF THE INSTRUMENT BOARD OF AN AUTOMOTIVE VEHICLE

The present invention relates to a control unit for the pilot lamps installed on the dashboard of an automotive vehicle equipped with an internal combustion engine. In order to display the operating status and the critical conditions of determined devices concerning the drive of the vehicle, the control unit comprises a central control unit operatively connected with the same pilot lamps, and with sensors suitable for detecting the operating status and the critical conditions of the devices.

BACKGROUND OF THE INVENTION

Generally, the instrument boards positioned on the dashboard of the automotive vehicles comprise the displays of several apparatuses, capable of measuring the value of physical quantities concerning the drive of the same vehicle, such as the tachometer, the odometer, and so forth, and a certain number of pilot lamps, which display the operating status of determined pieces of equipment, or critical conditions of physical quantities concerning the drive of the vehicle.

When the instrument board of an automotive vehicle is designed, a thorough investigation into the layout, the dimensions, the types of displays to be adopted is required, in order to find out the best solution for realizing and correctly positioning the various displays within the visual field of the driver and enable this Latter to find out the information with rapidity and precision, without distracting his attention from the road, and from the traffic conditions.

This general criterion is particularly valid for the pilot lamps, because all the operating faults which occur during the vehicle running considerably worry the driver, whose attention, if he finds difficulties in correctly identifying the site of the fault, is distracted from the drive.

Due to this reason, the present trend is to concentrate all of the optical pilot lamps in a particular area of the instrument board, in such a way that they are in front of the driver instead of being partly installed on the instrument board, and partly on a separate panel mounted on the dashboard.

Furthermore, in several cases the solution is adopted of camouflaging the graphic symbols relevant to the optical pilot lamps, so that they are not normally visible, and become visible only when so needed: either when their efficiency is tested, or when they light up in order to display the operating status of a device, critical conditions, faults, so that the driver's attention is surely called to them exactly when the situation so requires.

Usually, a group of optical pilot lamps are directly connected with the respective sensors, while a second group of pilot lamps are operatively connected with the respective sensors through a central control unit.

The central control unit verifies the functionality of the pilot lamps belonging to the second group, by turning them on, when the switchgear driven by the starting-up key is turned on, before the engine is started up. Subsequently during the running of the vehicle, only in case particular operating statuses, critical conditions, or faults, of the devices, occur, the pilot lamps belonging to the first group are directly turned on by the respective sensors, while those belonging to the second group are turned on by the central control unit.

SUMMARY OF THE INVENTION

The purpose of the present invention is to improve the systems known from the prior art, in particular as regards their efficiency and reliability.

This result is achieved by means of a control unit for the pilot lamps which, as compared to the systems known from the prior art, is capable of verifying at any time the functionality of the same pilot lamps, and which is also capable of analysing the conditions of the sensors by means of a very quick and reliable procedure.

The herein proposed control unit comprises a central control unit operatively connected with a first group of pilot lamps and with the sensors relevant to this first group of pilot lamps. While a second group of pilot lamps is directly connected with the relevant sensors, and the central control unit is furthermore operatively connected with first actuation means driven by the engine starting-up key. According to the present invention, the control unit is characterized in that the central control unit is also operatively connected with the second group of pilot lamps, and with handcontrolled second actuation means for turning on the pilot lamps of both of the above groups in order to verify their functionality. The same central control unit is operatively connected with the pilot lamps belonging to both of the above pilot lamp groups by means of a driver capable of sending the excitation signals to the pilot lamps belonging to both pilot lamp groups in the presence of actuation signals coming from the first actuation means, or from the second actuation means. Advantageously, the central control unit is capable of continuously detecting, in successive updating cycles having a predetermined period, the functional condition of the sensors, and therefore of the devices monitored by first group of pilot lamps, and is capable of serially sending during successive transmission cycles having the above predetermined period, the corresponding signals to the driver, which transmits them in parallel to the pilot lamps belonging to first pilot lamp group.

Therefore, with this solution, the sensors, and hence the devices, relevant to the first group of pilot lamps, are continuously supervised, so that possible anomalies can be quickly signalled to the driver. Moreover, the driver can verify that the absense of fault signalling is not due to faults in pilot lamps operation. Because whenever he so regards as necessary, he can verify the functionality of the pilot lamps belonging to both pilot lamp groups, even while the vehicle is running.

Characteristics and advantages of the present invention are illustrated now by referring to the hereto attached drawings, wherein a preferred form of practical embodiment of the invention is depicted for exemplifying, non-limitative purposes.

BRIEF DESCRIPTION OF THE DRAWINGS

in FIG. 3 and instrument board is depicted, the pilot lamps of which are managed by the control unit of FIG. 1.

DESCRIPTION OF THE PREFERRED EMBODIMENT

Figure 1:
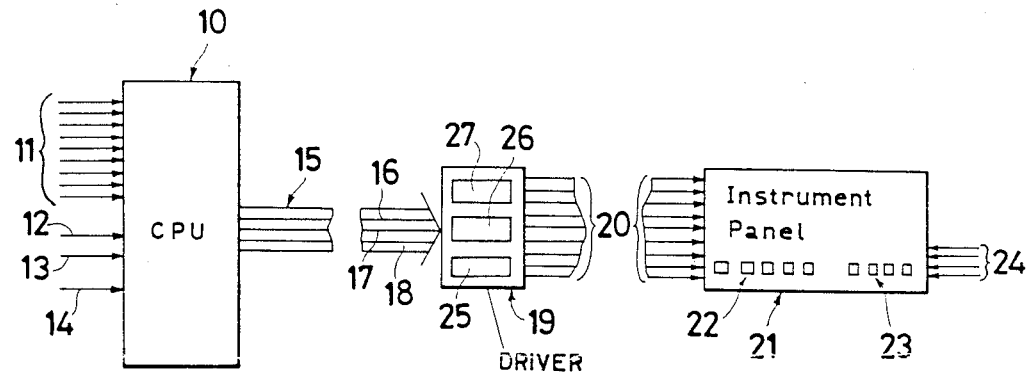
In FIG. 1 the pilot lamp control unit according to the present invention is shown by means of a block diagram.

In FIG. 1, by the reference numeral 10 the block is generally indicated, which is formed by the central control unit, comprising a programmed microprocessor and the interfaces for connection with the external devices.

By the reference numeral 11 the arrows are generally indicated, which represent the signals coming from the sensors, not shown in the figures, which are operatively connected with the vehicle devices whose operating status and critical conditions, or any faults, are to be detected by means of the central control unit 10.

These are generally the devices which are most difficult to be checked by the driver, and the relevant sensors are, e.g.: the sensor of maximum temperature of engine coolant liquid, the sensor which monitors the level of the same coolant liquid, the sensor of minimum pressure of engine lubricant, the sensor which monitors the level of the same lubricant, the sensor which monitors the level of the liquid of such services as the rear window washer and the headlights washer, the sensor detecting the jamming on of the parking brake, the sensor of the level of the liquid inside the braking system, the sensor of the wear of the brake pads, the sensor of the turning on of the stop lights, the sensors detecting the conditions of opening of the doors and bonnets of the vehicle.

The signals 11 are generally of low/high type, because they are generated by sensors formed by switchgears, e.g., of the normally closed type, so that the electrical continuity of the electrical circuit relevant to the same sensor can be verified too.

To the central control unit 10 also the signals come, which are represented by the arrows 12, 13, 14, the first one of which comes from the switchgear (not shown) driven by the engine starting-up key in its position of running, or of starting up, and is hence of low/high type; the second one of which comes from an auxiliary switchgear (not shown), manually controlled by the driver, e.g., by means of a pushbutton, and is also of low/high type; and the third one of which is supplied by a device which detects the revolution speed of the engine.

From the central control unit 10 the transmission line departs, which is generally indicated by the reference number 15 and is formed by the lines 16, 17, 18, the first of these lines being for the transmission of a clock, the second for the serial transmission of the data relevant to the signals 11, the third for the transmission of a load.

The line 15 is connected with the driver represented by the block 19, which is preferably formed by an integrated circuit comprising a shift register 25, a latch 26, and a buffer 27.

From the driver 19 the lines depart, which are generally indicated by the reference numeral 20, for the transmission of the signals to the optical pilot lamps installed on the instrument board 21, mounted on the dashboard of the automotive vehicle. Preferably, the graphic symbols of the pilot lamps are normally invisible, and become visible only when the pilot lamps turn on, whether for the check of functionality, and for signalling particular functional statuses or faults to the relevant devices.

These pilot lamps, schematically represented by small squares, belong to a first pilot lamp group, generally indicated by the reference number 22, which comprises the pilot lamps corresponding to the sensors operatively connected with the central control unit 10, and to a second pilot lamp group, generally indicated by the reference numeral 23, comprising the pilot lamps directly connected with the respective sensors.

These latter sensors, the signals of which are represented by the arrows generally indicated by the reference numeral 24, can be the same actuators of the devices directly controlled by the vehicle driver, and which can be hence directly and immediately checked, such as, e.g., the turning indicators, parking lights, low beams, high beams, fog lights, rear fog lights, emergency lights, rear window heater.

These sensors can also be those provided in order to monitor particular functions, such as, e.g., the charging status of the generator of electrical power, the fuel reserve inside the fuel tank.

Thus, the lines 20 departing from the driver 19 either transport the signals of actuation of the pilot lamps of both pilot lamp groups 22 and 23, or transport in parallel and simultaneously the drive signals, indicating either normal or abnormal statuses, Of the pilot lamps of pilot lamp group 22.

When the engine starting-up key is brought to its running position, and the relevant signal 12 comes to the central unit 10, this latter feeds the pilot lamps of both pilot lamp groups 22 and 23 with electrical current, temporarily and for a preestablished time, so that all pilot lamps light up and enable the driver to visually verify their efficiency.

At the end of the pre-established time period all pilot lamps are turned off, except those relevant to any possibly turned-on devices, those relevant to all devices under abnormal conditions, and also that relevant to the electrical power generator, if the engine of the vehicle has not been started up yet. The central control unit 10 also turns off the pilot lamp signalling the minimum oil pressure, because it is so prearranged as to consider as normal the situation of pressure absence when engine is stationary.

In fact, the central control unit 10 is capable of distinguishing the condition of stationary engine from the condition of running engine, by means of the signal of engine revolution speed 14. Only if this signal exceeds a pre-established value of minimum threshold, for a time longer than a predetermined time period, the central control unit 10 assumes that the engine has been started up.

After engine is started up, if the generator operates normally, the relevant pilot lamp turns off, and the central unit 10 carries out the verification of the minimum pressure of engine lubricating oil. If the minimum pressure is normal, the relevant pilot lamp remains turned off. While in case of an anomaly it is turned on, but only if the anomaly lasts more than a preestablished time period, in order to prevent wrong signallings due to transient changes in lubricant level.

By means of the device proposed by the present invention, the functionality of the pilot lamps belonging to the pilot lamp groups 22 and 23 can be verified also while the automotive vehicle is running, by manually switching on the switchgear, the signal of which is represented by the arrow 13. In this case too, the central control unit 10 feeds all the pilot lamps with electrical current, while this switchgear is kept closed, enabling the driver to rapidly and reliably check their functionality.

Figure 2:
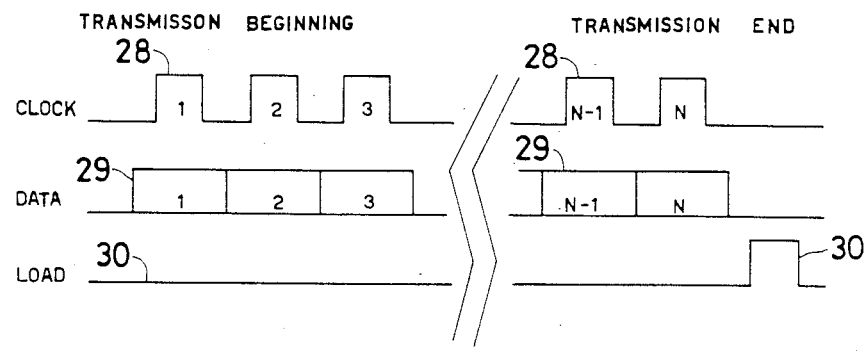
in FIG. 2, the value is shown as a function of time, of some signals processed by the control unit of FIG. 1.

The status of the signals 11 relevant to the pilot lamp group 22 is continuously monitored by the central control unit 10, and the data sent to the driver 19 are updated during successive cycles of detection and transmission, as shown in FIG. 2.

In correspondence of each clock pulse 28 entering the driver 19, to the shift register 25 the data 29 are progressively loaded, which are serially transmitted through the data line 17; such data are either constituted by the signal of excitation of the pilot lamps of both pilot lamp groups 22 and 23 in order to verify their functionality, or by the signals indicative of the functional status of the devices controlled by the pilot lamps of the first pilot lamp group 22. The contents of the shift register 25 are transferred to output when the load 30 turns to high, and is thus stored in the buffer 27 until the following loading, ready to be sent to the pilot lamps belonging to pilot lamp group 22 in parallel, and, in the specific case, also simultaneously, through the lines 20.

In FIG. 2, shown are: the transmission beginning, at the top; and the transmission end, at the bottom. The period of each detection and transmission cycle can be of the order of hundreds of milliseconds, e.g., 250 milliseconds, and therefore any possible anomalies in the devices checked by the pilot lamps belonging to pilot lamp group 22 can be displayed extremely quickly on the instrument board 21.

In the instrument board 21 shown in FIG. 3, some instruments are shown, such as the tachometer 31, the revolution indicator 32, the voltmeter 33, the pressure gauge 34, the thermometer 35, the fuel level gauge 36.

In the instrument board, also the pilot lamps 22a–22o of pilot lamp group 22, and the pilot lamps 23a–23m of pilot lamp group 23 are shown, as they appear when are turned on, because they are normally invisible.

We claim:

1. A control unit for pilot lamps which displays the operative condition of a number of sensors and the critical conditions of a number of sensor monitored devices of an automotive vehicle equipped with an engine, said control unit comprising a central control unit, first actuation means being driven by an engine starting key which sends an actuation signal whereby said central control unit is energized, said central control unit being operatively connected with a first group of pilot lamps and with a first group of sensors, each sensor of said first group of sensors having a first signal which indicates the operative condition of the respective sensor and having a second signal which indicates the critical condition of a particular monitored device, the first and second signals of each sensor of said first group of sensors being fed to said central control unit upon energizing by said first actuation means, a second group of pilot lamps operatively connected to said central control unit, a second group of sensors having a signal which indicates the critical condition of a particular monitored device, the signal of each sensor of said second group of sensors being directly fed to the pilot lamps of said second group of pilot lamps, said central control unit upon being energized by said first actuation means energizes each lamp of said first and second groups of pilot lamps whereby all lamps are lighted and viewable by an operator of the automobile vehicle indicating the functionality of all pilot lamps, said central control unit continues monitoring the second signals of each sensor of said first group of sensors, and energizes a particular pilot lamp associated with the sensor from which a second signal indicating the critical condition of the particular monitored device is received whereby the operator of the automobile vehicle will visually be alerted by the lighted pilot lamp, second actuation means being hand-controlled for sending an actuation signal to said control unit to energize each pilot lamp of both said first and second groups of pilot lamps whereby each pilot lamp is lighted to verify the functionality of each pilot lamp, and driver means operatively being connected to said central control unit and pilot lamps of said first and second groups of pilot lamps for sending excitation signals for said pilot lamps in the presence of the actuation signals of said first and second actuation means whereby the functionality of each pilot lamp is verified.

2. The control unit according to claim 1, wherein said central control unit continuously monitors the first and second signals of each sensor of said first group of sensors in a succession of updating transmission cycles with each cycle having a predetermined period, signals corresponding to each successive transmission cycle are sent to said driver means, said driver means transmits the corresponding signals to the pilot lamps of said first group of pilot lamps.

3. The control unit according to claim 2, wherein one sensor of said first group of sensors monitors a lubrication system having a pressure within the engine whereby a drop in the presence of lubricating pressure is indicated to the operator of the vehicle, said central control unit is also operatively connected with detector means for detecting the speed of revolution of the engine whereby the condition of an engine not running is distinguished from the condition of a running engine and said central control unit is prearranged to regard as normal the situation of absence of lubricating pressure when the engine is not running.

4. The control unit according to claim 1, wherein said driver means includes an integrated circuit, said integrated circuit comprises shift register for receiving in series data transmitted from said central control unit, said shift register has a predetermined data load transfers the data to a buffer which stores the transferred data keeping it ready for transmission to the relevant pilot lamp, latch means between said shift register and said buffer for preventing transfer of data from said shift register to said buffer until the predetermined data load is reached, said central control unit is connected to said driver means by a transmission line, said transmission line is formed by a line for the transmission of a clock pulse, by a line for serial transmission of the data relevant to the signals coming from said first group of sensors.

* * * * *